(12) United States Patent
Hoetzeldt

(10) Patent No.: US 9,700,995 B2
(45) Date of Patent: Jul. 11, 2017

(54) INSTALLATION DEVICE

(71) Applicant: Airbus Operations GmbH, Hamburg (DE)

(72) Inventor: Stephan Hoetzeldt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 298 days.

(21) Appl. No.: 14/556,816

(22) Filed: Dec. 1, 2014

(65) Prior Publication Data

US 2015/0174739 A1  Jun. 25, 2015

(30) Foreign Application Priority Data

Dec. 19, 2013 (EP) .................................... 13198539

(51) Int. Cl.
| | | |
|---|---|---|
| *B25B 11/00* | (2006.01) | |
| *B64C 1/06* | (2006.01) | |
| *B64F 5/10* | (2017.01) | |

(52) U.S. Cl.
CPC .............. *B25B 11/00* (2013.01); *B64C 1/066* (2013.01); *B64F 5/10* (2017.01); *Y10T 29/49895* (2015.01)

(58) Field of Classification Search
CPC . B23Q 1/28; B23Q 1/25; B23Q 1/706; B23Q 3/06
See application file for complete search history.

(56) References Cited

U.S. PATENT DOCUMENTS

| | | | | |
|---|---|---|---|---|
| 5,810,333 | A * | 9/1998 | Hickerson | A62B 3/005 254/133 R |
| 6,889,968 | B1 * | 5/2005 | Wong | B23Q 3/069 269/101 |
| 7,374,380 | B2 * | 5/2008 | Huang | E04H 12/182 410/143 |
| 7,490,813 | B1 * | 2/2009 | Weddle | A62B 3/005 248/354.1 |
| 8,448,317 | B2 * | 5/2013 | Fra | F16D 65/563 248/354.3 |

(Continued)

FOREIGN PATENT DOCUMENTS

| | | |
|---|---|---|
| DE | 3637490 | 5/1988 |
| DE | 102010017822 | 10/2011 |

OTHER PUBLICATIONS

European Search Report, Apr. 29, 2014.

*Primary Examiner* — Lee D Wilson
(74) *Attorney, Agent, or Firm* — Greer, Burns & Crain Ltd.

(57) ABSTRACT

A device for installing a lining panel in an aircraft. The installation device comprises a main beam having first and second sections and a hinge pivotably connecting a first end of the first and second sections such that the first section can be pivoted relative to the second section about an axis perpendicular to a longitudinal axis of the first section. A first beam is provided at a second end of the first section, movable relative to the first section along its longitudinal axis, and a second beam is provided at a second end of the second section, movable relative to the second section along its longitudinal axis. Also, a first longitudinal element connected to an end of the first beam facing away from the first section, and a second longitudinal element connected to an end of the second beam facing away from the second section are provided.

14 Claims, 15 Drawing Sheets

(56) References Cited

U.S. PATENT DOCUMENTS

| | | | |
|---|---|---|---|
| 9,038,253 B2* | 5/2015 | Herbold | F01D 25/285 |
| | | | 29/235 |
| 9,234,537 B2* | 1/2016 | Huang | E04G 25/06 |
| 2013/0087656 A1 | 4/2013 | Hoetzeldt | |
| 2015/0174739 A1* | 6/2015 | Hoetzeldt | B64C 1/066 |
| | | | 29/464 |

* cited by examiner

INSTALLATION DEVICE

CROSS-REFERENCES TO RELATED APPLICATIONS

This application claims the benefit of the European patent application No. 13 198 539.2 filed on Dec. 19, 2013, the entire disclosures of which are incorporated herein by way of reference.

BACKGROUND OF THE INVENTION

The present invention relates to an installation device for installing a lining panel in an aircraft, a package comprising a lining panel as well as a method of mounting lining panels in an aircraft using an installation device.

In aircraft, cargo compartments usually comprise a bar structure which is mounted on the inner walls of the aircraft. The bar structure serves as a supporting means for a plurality of lining panels which are mounted on the bar structure. The lining panels are preferably connected with each other in a gastight manner.

In order to mount the lining panels on the bar structure, several persons are needed. One person has to hold the lining panel and press it against the bar structure. The other person fixes the lining panel to the bar structure using, for example, screws. This mounting procedure is very time consuming since at least one person has to hold the lining panel and is thus prevented from engaging in other activities.

FIGS. 1a to 1f show a mounting process as described above. In FIGS. 1a and 1b, a lining module 1 is transported by workers 2 through an opening 3 into an aircraft 4. In FIG. 1c, the workers 2 transport the lining module 1 through a cargo compartment 5 of the aircraft 4. In the cargo department 5, a bar structure comprising a plurality of bars 6 is provided which is mounted on the inner walls 7 (here: the side walls and the ceiling) of the aircraft 4. The bar structure serves as a supporting means for mounting lining panels 1. In FIG. 1d, one worker 2 holds the lining panel 1 and presses it against the bars 6. The other worker 2 fixes the lining panel 1 to the bars 6 using screws, as shown in FIG. 1e. As soon as all bars 6 of the bar structure have been covered with lining panels 1, the cargo compartment 5 is ready for use, see FIG. 1f.

SUMMARY OF THE INVENTION

It is an object of the present invention to provide a means which facilitates the mounting process of lining panels in aircraft.

According to an aspect of the present invention, an installation device for installing a lining module in an aircraft comprises a main beam having a first main beam section and a second main beam section and a hinge pivotably connecting a first end of the first main beam section and a first end of the second main beam section with each other such that the first main beam section can be pivoted relative to the second main beam part section about an axis aligned perpendicular to a longitudinal axis of the first main beam section. The installation device further comprises a first movable beam provided at a second end of the first main beam section such that it is movable relative to the first main beam section along a longitudinal axis thereof, and a second movable beam provided at a second end of the second main beam section such that it is movable relative to the second main beam section along a longitudinal axis thereof. A first longitudinal element is connected to an end of the first movable beam facing away from the first main beam section, and a second longitudinal element is connected to an end of the second movable beam facing away from the second main beam section. Due to the use of movable beams, the installation device can be made very compact during transport, and extended on demand during installation. Further, due to the use of the longitudinal elements, the lining panels can be positioned very easily which will be described later in more detail.

The hinge may comprise a damping means which dampens the pivoting of the first main beam section relative to the second main beam section. Thus, the pivoting can be carried out in a controlled manner.

An end of the first longitudinal element may facing away from the first movable member may be connected to a first hook, and/or an end of the second longitudinal element facing away from the second movable member may be connected to a second hook. In this way, the installation device can be connected to a fixing structure via the hooks quite easily.

The first longitudinal element may be connected to a third hook provided between the first hook and the first movable member, and/or the second longitudinal element may be connected to a fourth hook provided between the second hook and the second movable member. This enables to suspend the installation device from a fixing structure at different heights.

The second end of the first main beam section has the shape of a tube into which at least a part of the first movable beam is inserted, wherein the inserted part of the first movable beam is movable within the tube along the longitudinal axis of the first main beam section. Alternatively or additionally, the second end of the second main beam section has the shape of a tube into which at least a part of the second movable beam is inserted, wherein the inserted part of the second movable beam is movable within the tube along the longitudinal axis of the second main beam section. Thus, the installation device can be easily extended or compressed on demand.

A first slit may be provided in a wall of the second end of the first main beam section, wherein the inserted part of the first movable beam is connected to a first protruding element which penetrates through the first slit, and wherein, by sliding the first protruding element along the first slit, the first movable beam is moved along the longitudinal axis of the first main beam section. Alternatively or additionally, a second slit may be provided in a wall of the second end of the second main beam section, wherein the inserted part of the second movable beam is connected to a second protruding element which penetrates through the second slit, and wherein, by sliding the second protruding element along the second slit, the second movable beam is moved along the longitudinal axis of the second main beam section. The first protruding element may be adapted to be switched from a first state in which sliding along the first slit is possible, into a second state in which sliding along the first slit is blocked, and vice versa. Alternatively or additionally, the second protruding element can be switched from a second state in which sliding along the second slit is possible, into a second state in which sliding along the second slit is blocked, and vice versa. Thus, an undesired movement of the first movable beam or the second movable beam during transportation of the installation device can be prevented.

At least parts of the outer surface of the first main beam section and the second main beam section may be respectively covered with a damping element. The damping element may be a foam layer. Thus, the lining panel can be supported without having the danger of damaging the lining panel (e.g., scratches, etc.)

The longitudinal elements may, for example, be flexible ropes or rigid rods pivotably connected to the movable beams.

According to an aspect of the present invention, a package is provided comprising at least one installation device according to any embodiment of the present invention, and at least one lining panel wrapped around the at least one installation device, the at least one lining panel being adapted to be mounted to a bar structure within an aircraft.

A surface of the at least one lining panel facing towards the at least one installation device may comprise removably attached fixing elements at which hooks can be fixed. The package may comprise two installation devices which are spaced apart from each other and are aligned parallel to each other, wherein a lining panel may be wrapped around the installation devices such that two opposing edges of the lining panel which are aligned parallel to the longitudinal axes of the installation devices are connected with each other (e.g., via a zipper) or overlap with each other. Due to the overlap, the length of the lining panel can be increased, thereby being able to transport in a very compact manner a large lining panel.

The first longitudinal element and/or the second longitudinal element may extend over edges of the lining panel aligned perpendicular to the longitudinal axes of the installation devices. This makes it possible to use the longitudinal elements as grips when lifting the package should it be not possible to grasp the first/second movable beam (which may be covered by the wrapped lining panel).

According to an aspect of the present invention, a method of mounting lining panels of packages according to any embodiment of the present invention to a bar structure within an aircraft is provided. The method comprises connecting the longitudinal elements of a first package to a fixing structure which is removably connected to the bar structure, thereby suspending the at least one installation device and thus the whole first module from the bar structure. The method further comprises de-wrapping parts of a first lining panel from the at least one installation device, and fixing the de-wrapped parts or other parts of the first lining panel to the bar structure while the at least one installation device supports the other parts of the first lining panel during the fixing process. After having fixed the first lining panel to the bar structure, the longitudinal elements are removed from the fixing structure in order to remove the at least one installation device.

The fixing structure may comprise mounting bridges which are detachably attachable to a pair of adjacent bars of the bar structure such that each mounting bridge connects the adjacent bars, wherein the longitudinal elements are fixed to a part of the mounting bridges which is located between the adjacent bars, and wherein an edge of the lining panel is positioned below one of the pair of beams for fixation, however the lining panel does not cover an area between the adjacent bars.

The longitudinal elements of a second package may be connected to fixing elements removably attached on the surface of the first lining panel which has already been mounted to the bar structure, thereby suspending the at least one installation device and thus the whole second package at least partly from the first lining panel. After this, parts of a second lining panel may be de-wrapped from the at least one installation device, and the de-wrapped parts or other parts of the second lining panel may be fixed to the bar structure while the at least one installation device supports the other parts of the lining panel. After having fixed the second lining panel to the bar structure, the longitudinal elements may be removed from the removably attached fixing elements in order to remove the at least one installation device. Due to the use of removable fixing elements, the first lining panel can be used as fixing structure. This makes it possible to locate the fixing structure away from the bar where the lining panel is fixed. As a consequence, the positioning process of the lining panel relative to the bar of the bar structure where the lining panel is to be fixed is easier.

BRIEF DESCRIPTION OF THE DRAWINGS

In the following description, preferred embodiments of the present invention will be explained by way of example while making reference to the accompanying drawings, wherein.

DETAILED DESCRIPTION OF THE PREFERRED EMBODIMENTS

Figure 2:
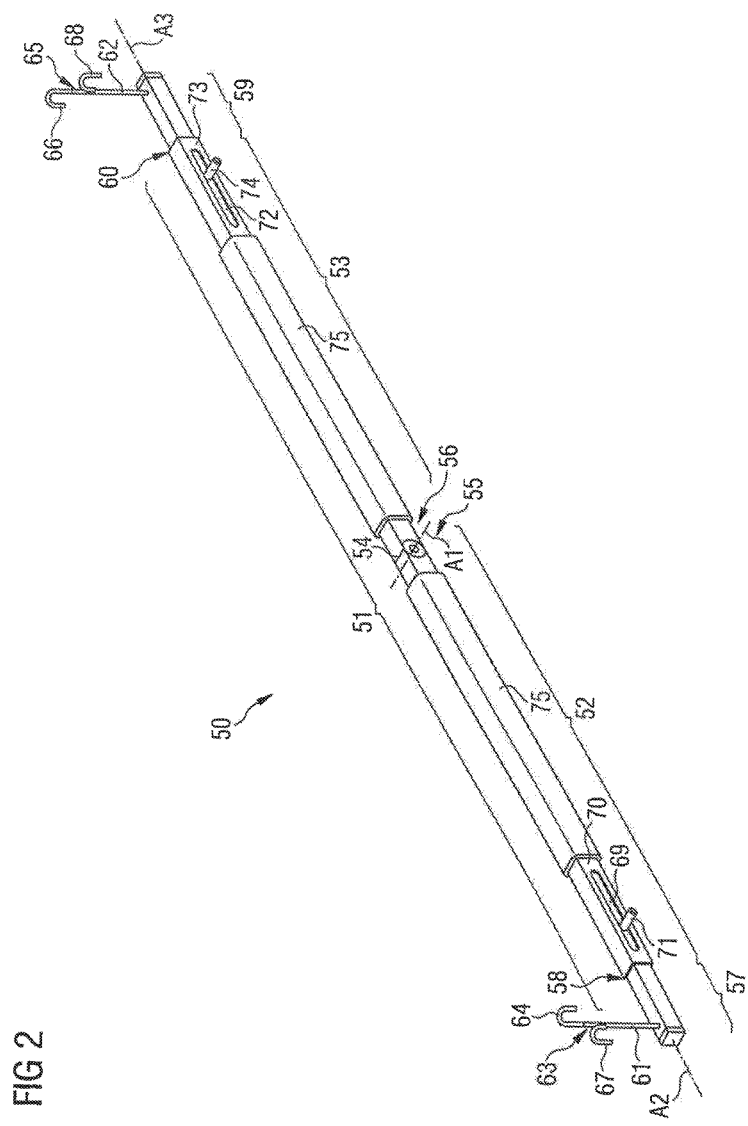
FIG. 2 shows an installation device according to one embodiment of the present invention.

FIG. 2 shows an installation device 50 for installing a lining module in an aircraft. The installation device 50 comprises a main beam 51 having a first main beam section 52 and a second main beam section 53 and a hinge 54 pivotably connecting a first end 55 of the first main beam section 52 and a first end 56 of the second main beam section 53 with each other such that the first main beam section 52 can be pivoted relative to the second main beam section 53 about an axis A1 aligned perpendicular to a longitudinal axis A2 of the first main beam section 52. The installation device 50 further comprises a first movable beam 57 provided at a second end 58 of the first main beam section 52 such that it is movable relative to the first main beam section 52 along a longitudinal axis A2 thereof, and a second movable beam 59 provided at a second end 60 of the second main beam section 53 such that it is movable relative to the second main beam section 53 along a longitudinal axis A3 thereof. A first longitudinal element 61 is connected to an end of the first movable beam 57 facing away from the first main beam section 52, and a second longitudinal element 62 is connected to an end of the second movable beam 59 facing away from the second main beam section 53. In this example, the longitudinal elements 61, 62 are flexible ropes. Further, parts of the outer surface of the first main beam section 52 and the second main beam section 53 are respectively covered with damping elements 75 (foam layers).

The hinge 54 may comprise a damping means (not shown) which dampens the pivoting of the first main beam section 52 relative to the second main beam section 53.

An end 63 of the first longitudinal element 61 facing away from the first movable beam 57 is connected to a first hook 64, and an end 65 of the second longitudinal element 62 facing away from the second movable beam 59 is connected to a second hook 66. The first longitudinal element 61 is further connected to a third hook 67 provided between the first hook 64 and the first movable beam 57, and the second longitudinal element 62 is connected to a fourth hook 68 provided between the second hook 66 and the second movable beam 59.

The second end 58 of the first main beam section 52 has the shape of a tube into which a part of the first movable beam 57 is inserted, wherein the inserted part of the first movable beam 57 is movable within the tube along the longitudinal axis A2 of the first main beam section 52. Likewise, the second end 60 of the second main beam section 53 has the shape of a tube into which a part of the second movable beam 59 is inserted, wherein the inserted part of the second movable beam 59 is movable within the tube along the longitudinal axis A3 of the second main beam section 53. The first movable beam 57 may be fully inserted into the first main beam section 52, and the second movable beam 59 may be fully inserted into the second main beam section 53.

A first slit 69 is provided in a side wall 70 at the second end 58 of the first main beam section 52, wherein the inserted part of the first movable beam 57 is connected to a first protruding element 71 which penetrates through the first slit 69. By sliding the first protruding element 71 along the first slit 69, the first movable beam 57 is moved along the longitudinal axis A2 of the first main beam section 52. Likewise, a second slit 72 is provided in a wall 73 at the second end 60 of the second main beam section 53, wherein the inserted part of the second movable beam 53 is connected to a second protruding element 74 which penetrates through the second slit 72, and wherein, by sliding the second protruding element 74 along the second slit 72, the second movable beam 59 is moved along the longitudinal axis A3 of the second main beam section 53.

The first protruding element 71 may be configured to be switched from a first state in which sliding along the first slit 69 is possible, into a second state in which sliding along the first slit 69 is blocked, and vice versa. For example, the first protruding element 71 may have a first base part having a male outer shape connected to the first movable beam 57, and a second part having a female inner shape movable (by screwing) on the first part in a direction towards the first slit 69 (first screwing direction) and away from the first slit 69 (second screwing direction). The second protruding element 74 may be configured in the same way.

Figure 3:
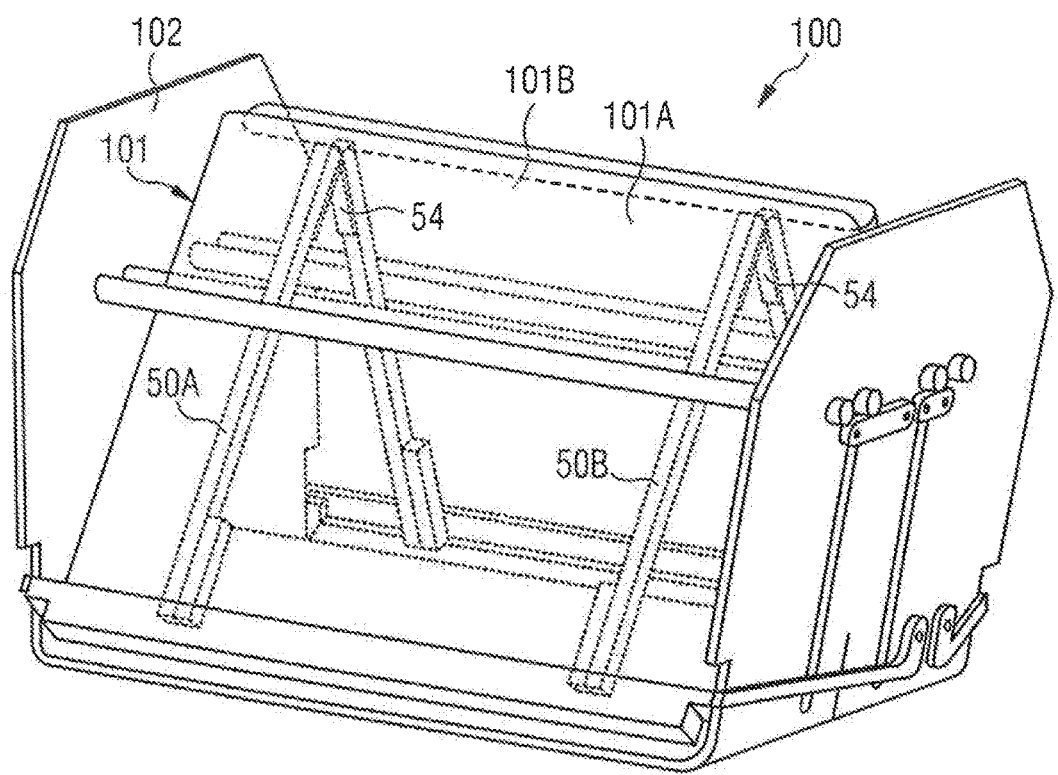
FIG. 3 shows a module according to one embodiment of the present invention.

FIG. 3 shows a package 100 comprising a first installation device 50A and a second installation device 50B as described above, and a lining panel 101 wrapped around the installation devices 50A, 50B. The lining panel 101 comprises a first lining panel part 101A wrapped around the first main beam sections 52 of the first installation device 50A and of the second installation device 50B, and a second lining panel part 101B wrapped around the second main beam sections 53 of the first installation device 50A and of the second installation device 50B. The first lining panel part 101A is separated from the second lining panel part 101B along an area extending around axis A1. The installation devices 50A, 50B are spaced apart from each other and are aligned parallel to each other. In each installation device 50A, 50B, the first main beam section 52 has been pivoted relative to the second main beam section 53 about an axis A1 aligned perpendicular to a longitudinal axis A2 of the first main beam section 52 such that the corresponding first main beam section 52 and the second main beam section 53 form an angle α with each other of less than 90°. The first lining panel part 101A is wrapped around the first main beam sections 52 of the first installation device 50A and of the second installation device 50B such that two opposing edges 120, 121 of the first lining panel part 101A which are aligned parallel to the longitudinal axes A2, A3 of the installation devices 50A, 50B are connected with each other or overlap with each other (see FIG. 4 where the opposing edges 120, 121 overlap). The same may be true for the second lining panel part 101B. The package 100 is temporally placed in a container 102 in order to ease the transportation of the package 100.

In the package transport state, as shown in FIG. 3, the movable beams 57, 59 are advantageously inserted as much as possible into the main beam sections 52, 53.

Figure 4:
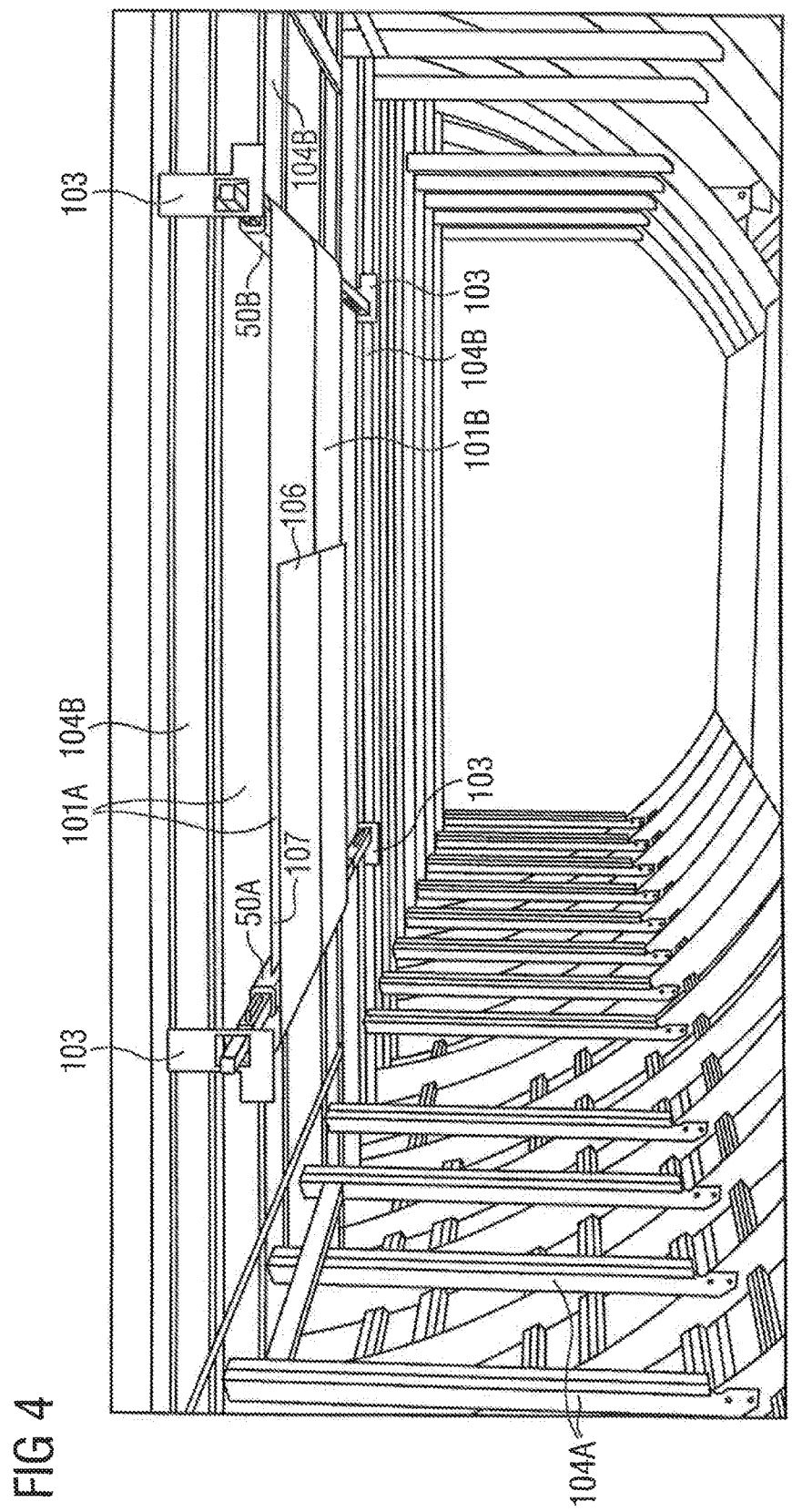
FIG. 4 shows a first mounting step of a lining panel mounting method according to a first embodiment of the present invention.

FIG. 4 shows a state after the package 100 has been "unfolded," i.e., in each installation device 50A, 50B, the first main beam section 52 has been pivoted relative to the second main beam section 53 about an axis A1 aligned perpendicular to a longitudinal axis A2 of the first main beam section 52 such that the corresponding first main beam section 52 and the second main beam section 53 form an angle α with each other of 180°. After having unfolded the package 100, the package 100 is lifted by the workers, and the movable beams 57, 59 are pulled out by moving the protruding elements 71, 74 and introduced into respective mounting elements 103 which are connected to vertically aligned bars 104A of a bar structure comprising vertically aligned bars 104A and horizontally aligned bars 104B which are respectively connected to inner walls 105 of an aircraft.

As can be derived from FIG. 4, the lining panels 101 which are made of flexible material are wrapped around the installation devices 50A, 50B such that, after having introduced the movable beams 57, 59 into the mounting elements 103 connected to the horizontally aligned bars 104B, a first longitudinal end part 106 of the lining panel 101 overlaps a second longitudinal end part 107 of the lining panel in order to be able to use large (long) lining panels, i.e., to transport large lining panels in a compact manner. The package 100 has been installed such that the first longitudinal end part 106 and the second longitudinal end part 107 of the lining panel 101 overlap on a lower side of the package 100 (a side facing away from the horizontally aligned bars 104B). The longitudinal end parts 106, 107 are then decoupled so that the longitudinal ends 106, 107 suspend from the installation devices 50A, 50B in a vertical direction. The part of the lining panel 101 which extends between the installation devices 50A, 50B in a horizontal direction is fixed to the horizontally aligned bars 104B by the workers. Then, the installation devices 50A, 50B are successively moved towards the vertically aligned bars 104A by moving the mounting elements 103 along the horizontally aligned bars 104B while fixing further parts of the lining panel 101 to the horizontally aligned bars 104B. As soon as the installation devices 50A, 50B reach the vertically aligned bars 104B, the remaining parts of the lining panel 101 are fixed to the vertically aligned bars 104A, see FIG. 5.

In this way, the installation devices 50A, 50B hold the lining panel 101 at the horizontally aligned bars 104B during the fixing process so that no extra worker is needed during the fixing process for holding the lining panel 101. After having reached the stage shown in FIG. 5, the installation devices 50A, 50B can be removed by moving the movable beams 57, 59 into the main beam sections 52, 53, thereby moving the movable beams 57, 58 out of the mounting elements 103. The removed installation devices 50A, 50B may be reused to manufacture a further package 100. Then, a further package 100 may be mounted in the same manner, until the whole bar structure is covered with lining panels 101.

Figure 5:
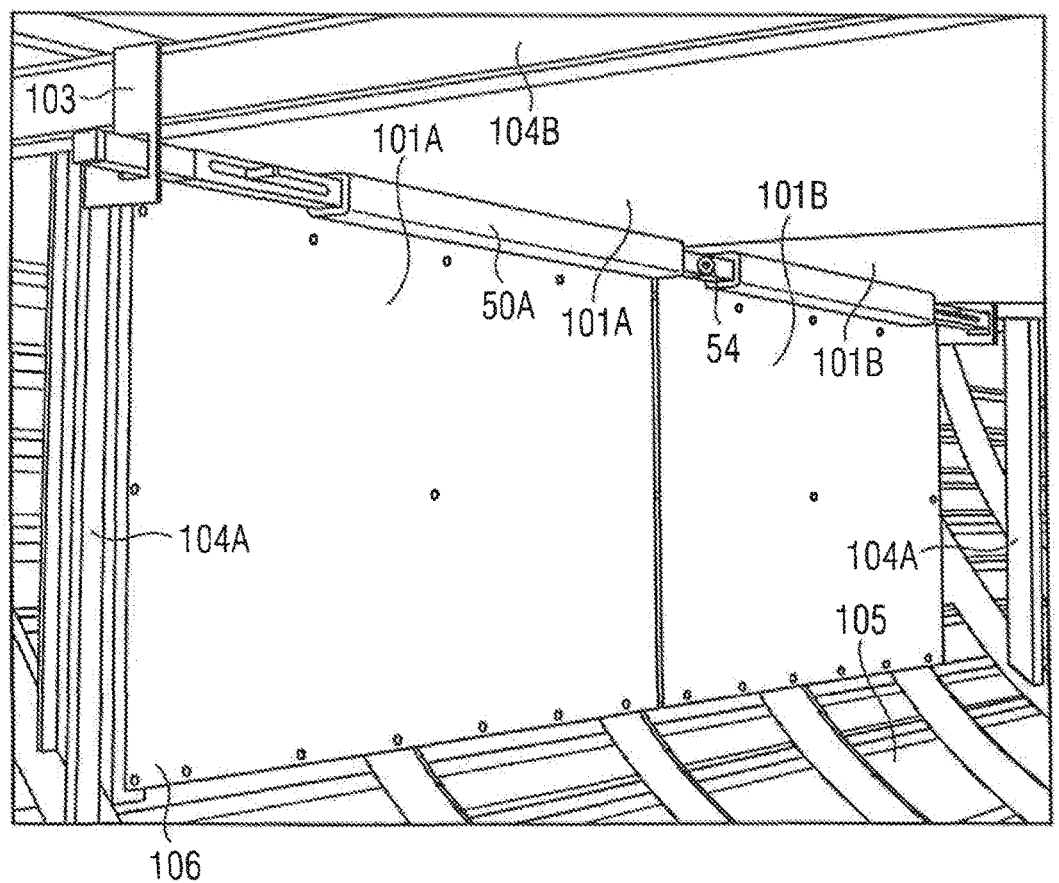
FIG. 5 shows a second mounting step of a lining panel mounting method according to the first embodiment of the present invention.

In the mounting method shown in FIGS. 4 and 5 has the disadvantage that the mounting elements 103 are rigid elements. Thus, it may not always be easy to introduce the movable beams 57, 58 into the mounting elements 103 or to fine tune the position of the lining panel 101 relative to the bars 104A, 104B after insertion. This problem is addressed by the mounting method which will be described in the following paragraphs.

Figure 6A:
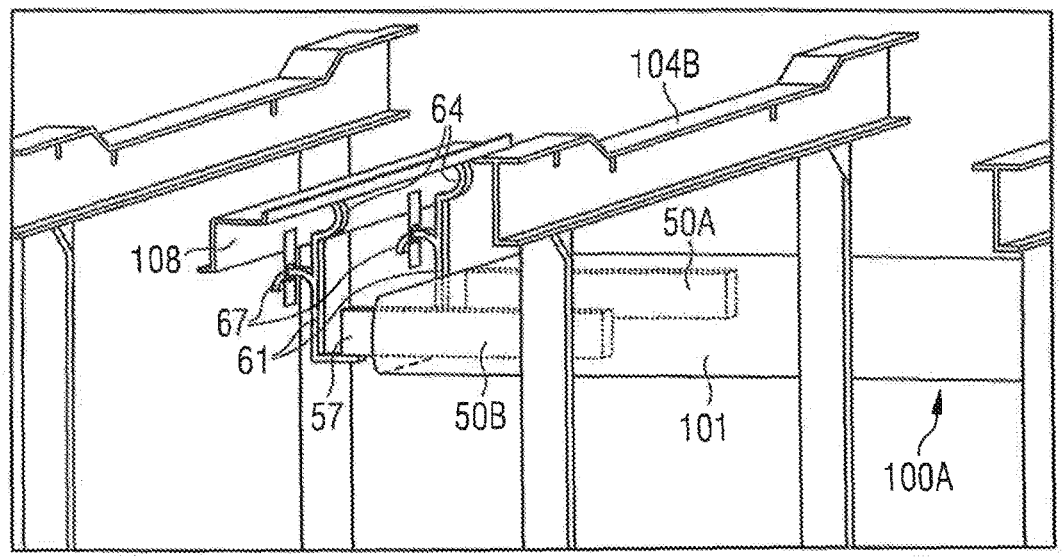
FIG. 6a) shows a first perspective in a first mounting step of a lining panel mounting method according to a second embodiment of the present invention.
Figure 6B:
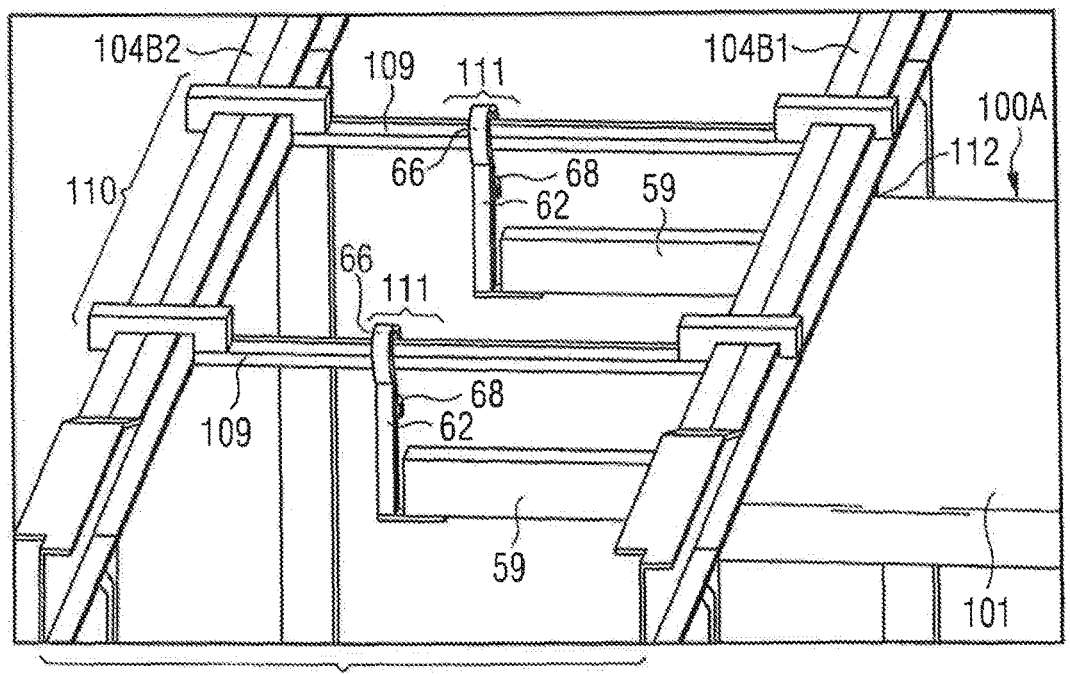
FIG. 6b) shows a second perspective in the first mounting step of a lining panel mounting method according to the second embodiment of the present invention.

In FIG. 6 a state is shown in which the first installation device 50A and the second installation device 50B of a first package 100A which respectively comprise first longitudinal elements 61 and second longitudinal elements 62 as shown in FIG. 2. Such longitudinal elements 61, 62 do not exist in the embodiment shown in FIGS. 4 and 5 or are not used in the mounting process should they exist. As shown in FIG. 6a, the first longitudinal elements 61 have been connected to a first fixing structure 108. The first fixing structure 108 is a horizontally aligned bar like element (profile) which is arranged between two adjacent horizontally aligned bars 104B of the bar structure. The first longitudinal elements 61 are fixed to the first fixing structure via the first hook 64. In case that the first movable beams 57 are long enough, the first fixing structure may also be constituted by the leftmost (104B') of the horizontally aligned bars 104B; in this case, the first longitudinal elements 61 may directly be connected to the leftmost bar 104B by the first hooks 64. As shown in FIG. 6b, the second longitudinal elements 62 have been connected to a second fixing structure 110. The second fixing structure 109 comprises two horizontally aligned mounting bridges 109 which are detachably attached to a pair of adjacent horizontally aligned bars 104B1, 104B2 of the bar structure such that each mounting bridge 109 connects the adjacent bars 104B1, 104B2, wherein the longitudinal elements 62 are fixed to a part 111 of the mounting bridges 109 which is located between the adjacent bars 104B1, 104B2. One edge 112 of the lining panel is positioned below one of the pair of bars (bar 104B1), however does not cover an area 113 located between the adjacent bars 104B1, 104B2. The second longitudinal elements 62 are fixed to the mounting bridges 109 via the second hook 66. In case that the second movable beams 59 are long enough, the second fixing structure may also be constituted by the leftmost (104B2) of the horizontally aligned bars 104B; in this case, the second longitudinal elements 62 may directly be connected to the leftmost bar 104B2 by the first hooks 64. In this way, the installation devices 50A, 50B and thus the whole first package 100A suspends from the first fixing structure 108 and the second fixing structure 109.

Figure 8:
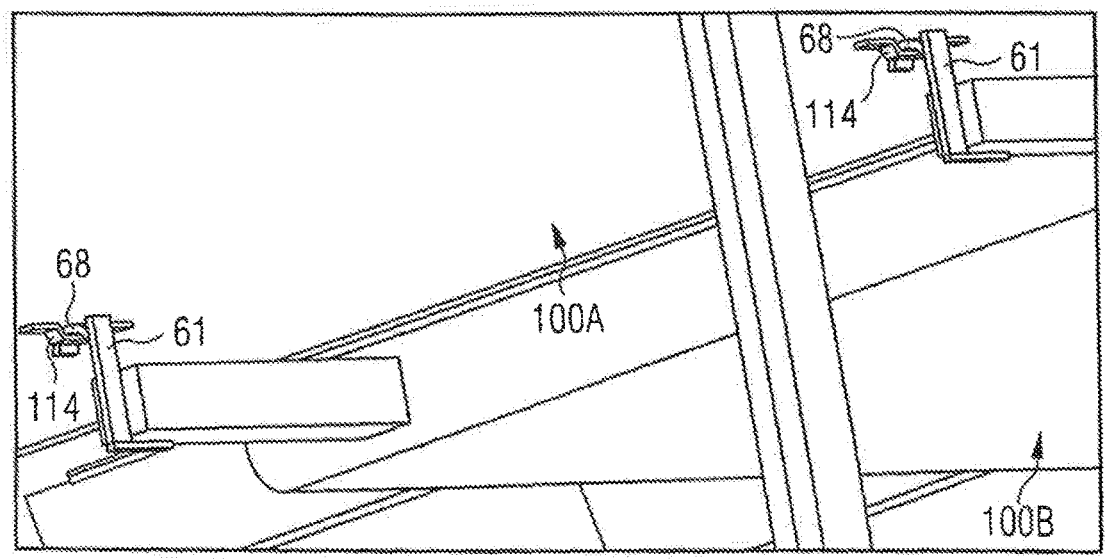
FIG. 8) shows a third mounting step of a lining panel mounting method according to the second embodiment of the present invention.

The method further comprises de-wrapping parts of the lining panel 101 (first lining panel) of the first package 100A from the installation devices 50A, 50B, and fixing the de-wrapped parts or other parts of the first lining panel to the horizontally aligned bars 104B, wherein the installation devices 50A, 50B support other parts of the first lining panel at the same time. After having fixed the first lining panel 101 to the horizontally aligned bars 104B, the longitudinal elements 61, 62 are removed from the fixing structures 108, 110 in order to remove the installation devices 50A, 50B. In order to be able to better fix the first lining panel 101 to the horizontally aligned bars 104B, the first package 100A may be lifted further up immediately before the fixing process such that the first longitudinal elements 61 are connected to the first fixing structure 108 via the third hooks 67, and the second longitudinal elements 62 are connected to the second fixing structure 110 via the fourth hooks 68, see e.g. FIG. 8. If the longitudinal elements 61, 62 are made of flexible material like ropes, the alignment of the first lining panel 101 relative to the horizontally aligned bars 104B before the fixing process is very easy. For example, the longitudinal elements 61, 62 may be designed such that the package 100 can be moved by +/−50 mm in the lateral direction.

Figure 7A:
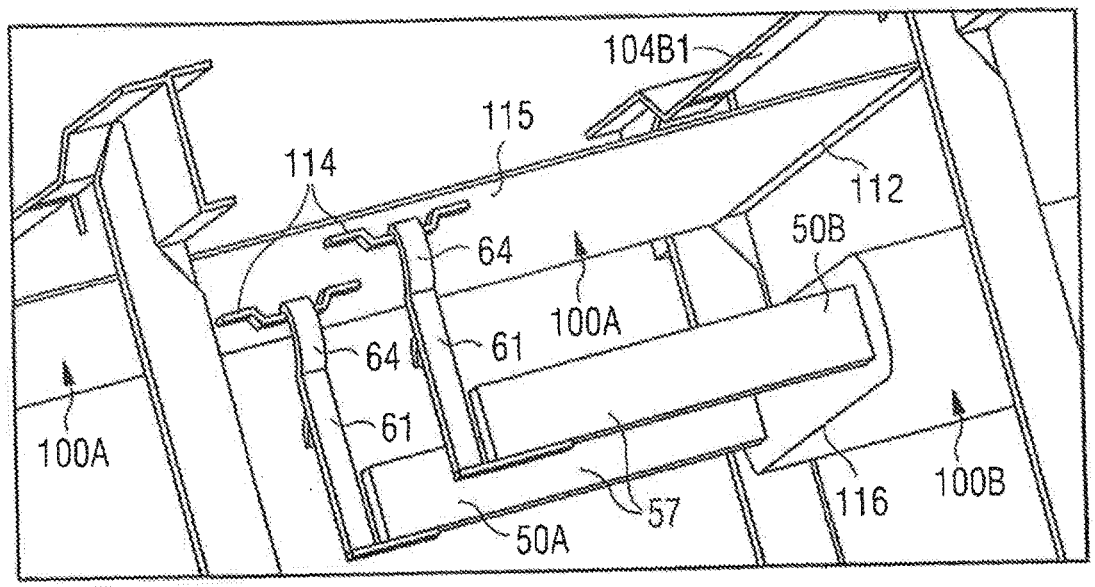
FIG. 7a) shows a first perspective in a second mounting step of a lining panel mounting method according to the second embodiment of the present invention.
Figure 7B:
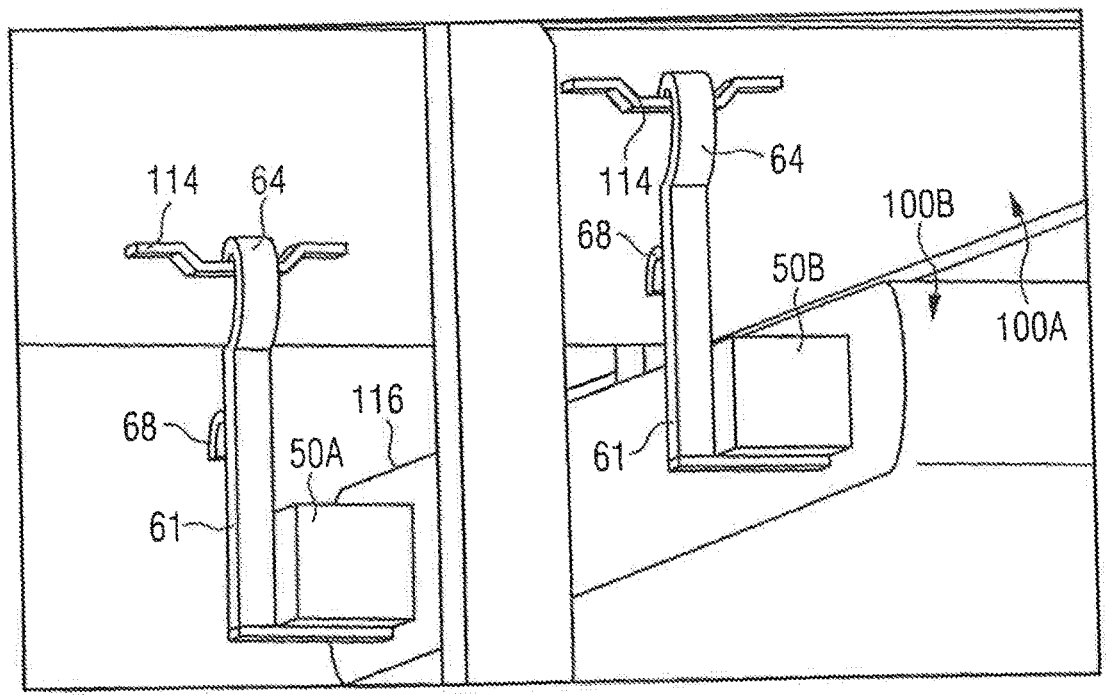
FIG. 7b) shows a second perspective in the second mounting step of a lining panel mounting method according to the second embodiment of the present invention.
Figure 7C:
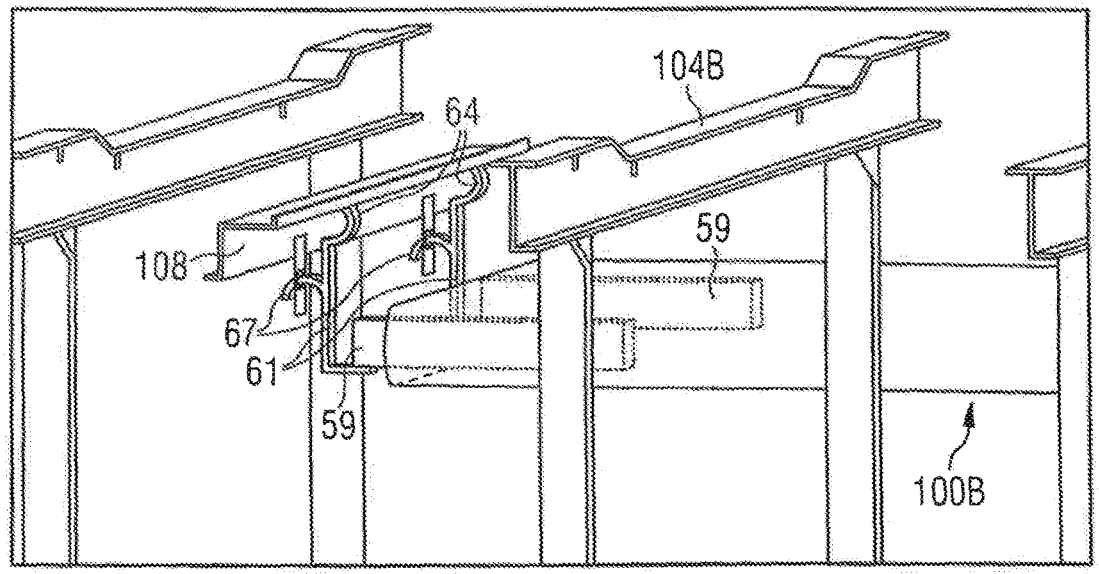
FIG. 7c) shows a third perspective in the second mounting step of a lining panel mounting method according to the second embodiment of the present invention.

As shown in FIG. 7, the first longitudinal elements 61 of a second package 100B may be connected to fixing elements 114 (first fixing structure) removably attached on a lower surface 115 of the first lining panel 101 which has already been mounted to the horizontally aligned bars 104B, thereby suspending the two installation devices 50A, 50B and thus the whole second package 100B partly from the first lining panel 100A. After this, parts of the lining panel 101 of the second package 100B (second lining panel 101') is de-wrapped from the installation device 50A, 50B, and the de-wrapped parts or other parts of the second lining panel 101' are fixed to the horizontally aligned bars 104B. Here, an edge of the 116 of the second lining panel 101' beyond which the movable beams 57 extend is aligned with the edge 112 of the first lining panel 101, i.e., both edges 116, 112 are positioned below the horizontally aligned bar 104B1. After having fixed the second lining panel 101' to the horizontally aligned bars 104B, the longitudinal elements 61, 62 are removed from the removably attached fixing elements 114 in order to remove the installation devices 50A, 50B. Then, the fixing elements 114 may be removed and used for preparing a further package 100. By repeating the above sequence, the whole bar structure 104 can be successively covered with lining panels 101.

Figure 10:
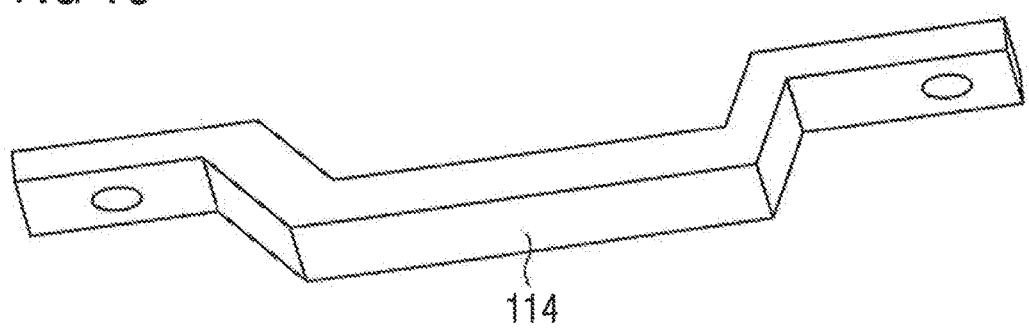
FIG. 10) shows a fixing element according to an embodiment of the present invention.

As shown in FIG. 10, the fixing element 114 may have a U-shaped section 140 at which the hooks of the longitudinal elements 61, 62 are fixed, and mounting sections 141 (comprising holes 142 for inserting screws) extending from ends of the U-shaped section 140.

Figure 9:
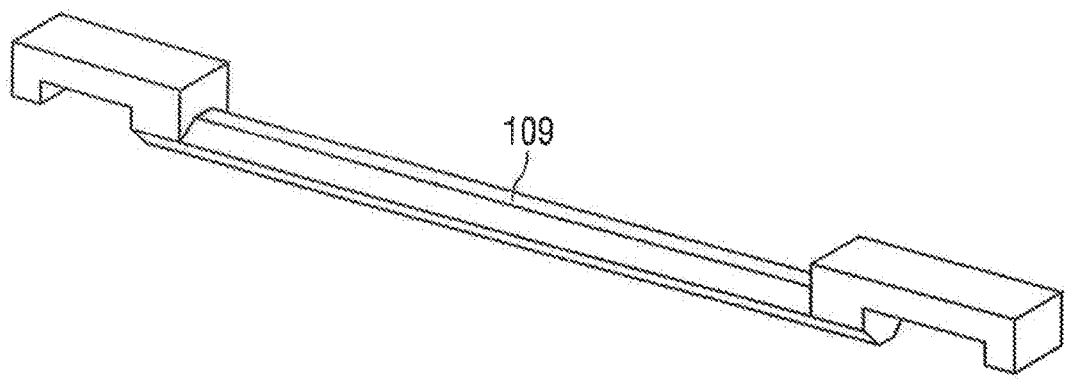
FIG. 9) shows a mounting bridge according to an embodiment of the present invention.

As shown in FIG. 9, the mounting bridges 109 may have a mounting sections 143 comprising an inverted U shape corresponding to the shape of the horizontally aligned bars 104B, and an intermediate section 144 at which the hooks of the longitudinal elements 61, 62 are fixed.

FIG. 11 further illustrates the mounting process as described above. In FIG. 11a, a module 100 is transported by workers 2 through an opening 3 into an aircraft 4. In FIG.

Figure 1A:
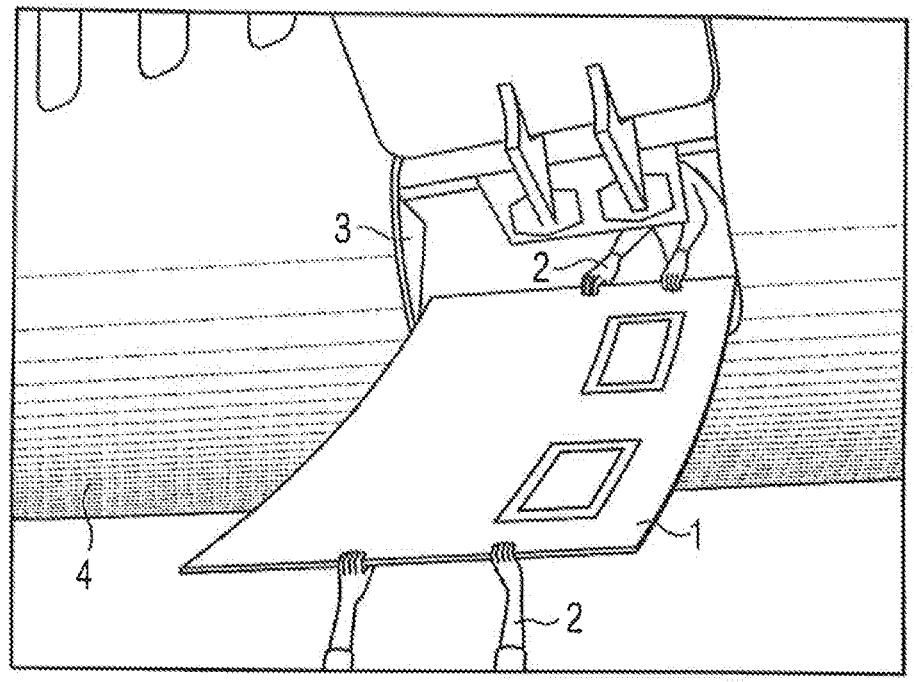
FIGS. 1a) to f) show steps of a mounting process in a conventional lining panel mounting method.
Figure 1B:
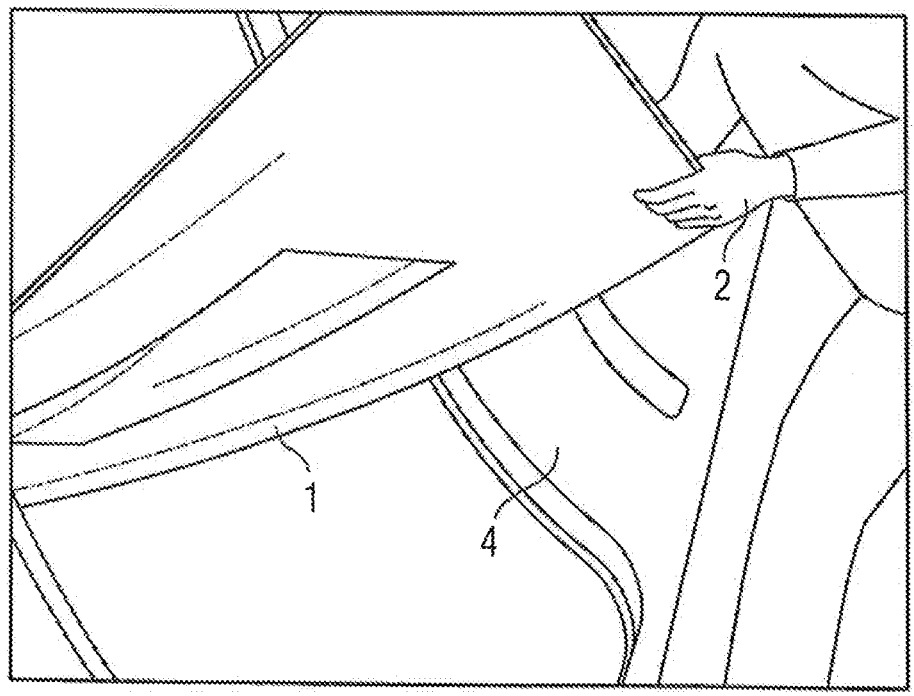
Figure 1C:
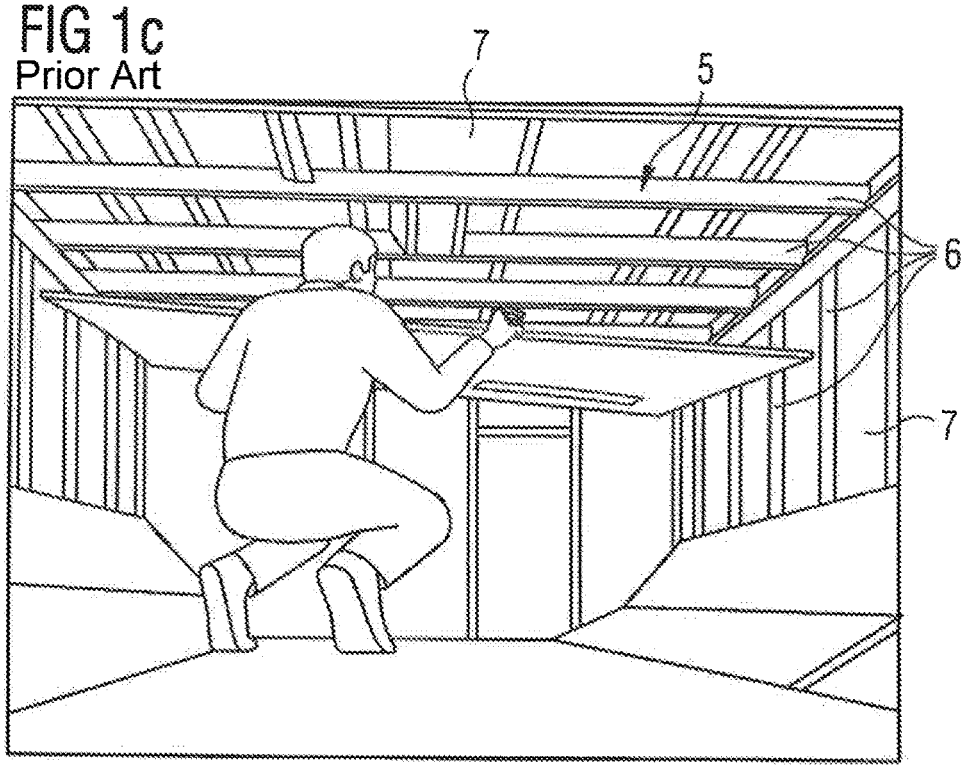
Figure 1D:
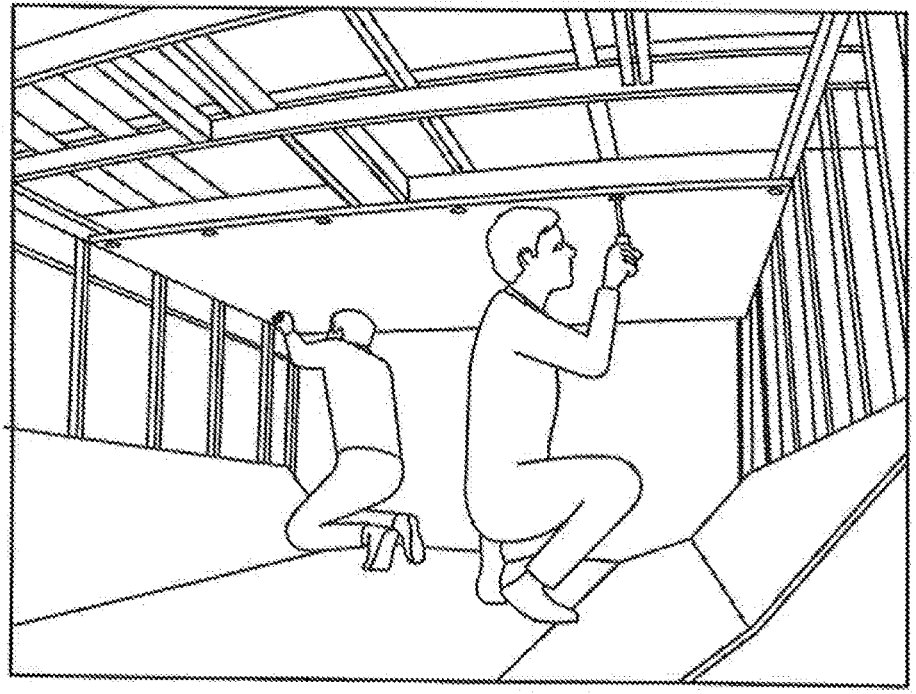
Figure 1E:
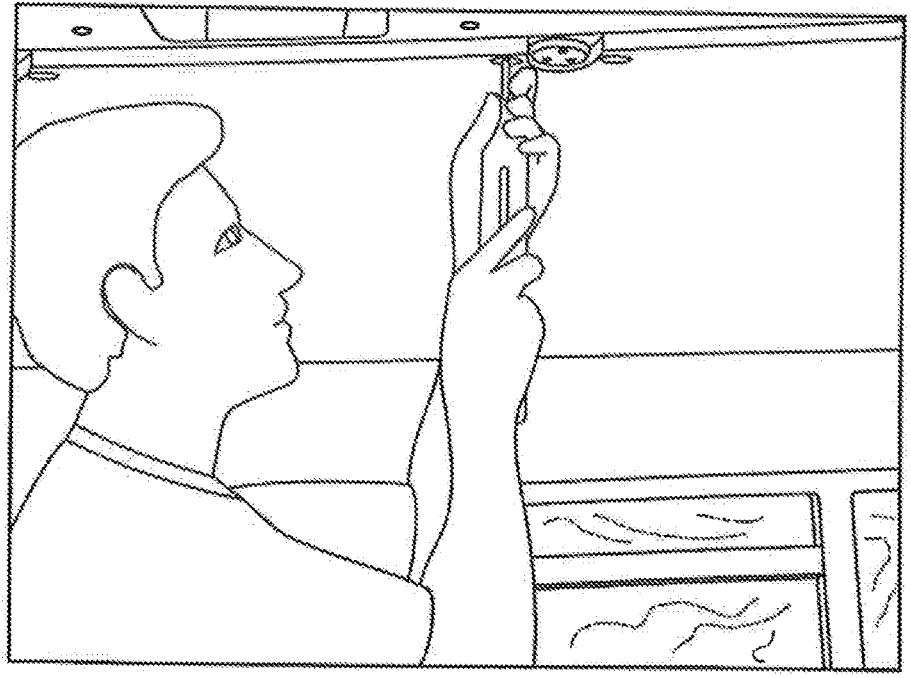
Figure 1F:
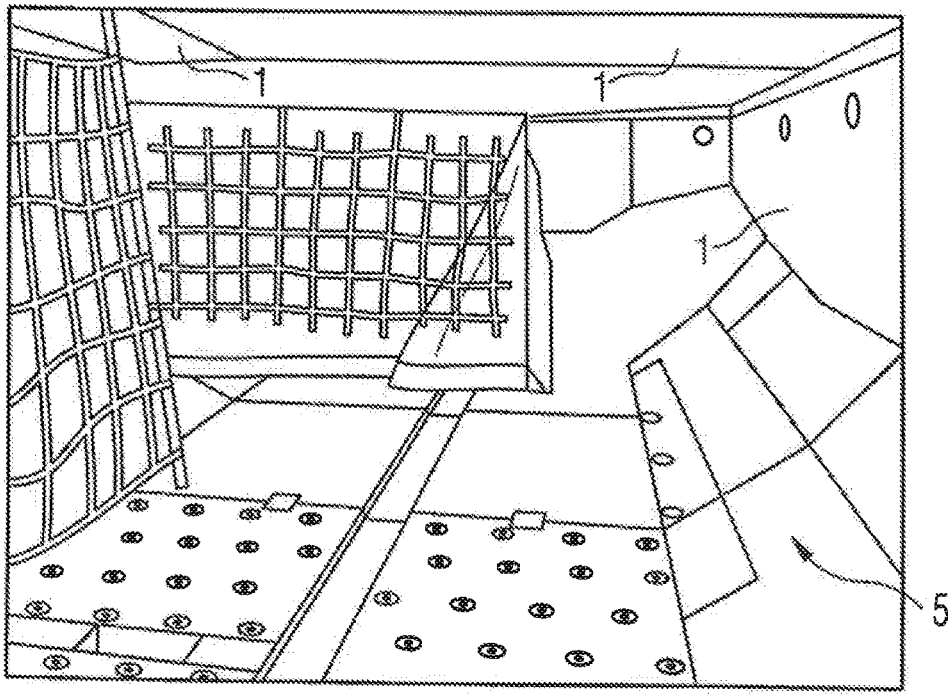
Figure 11A:
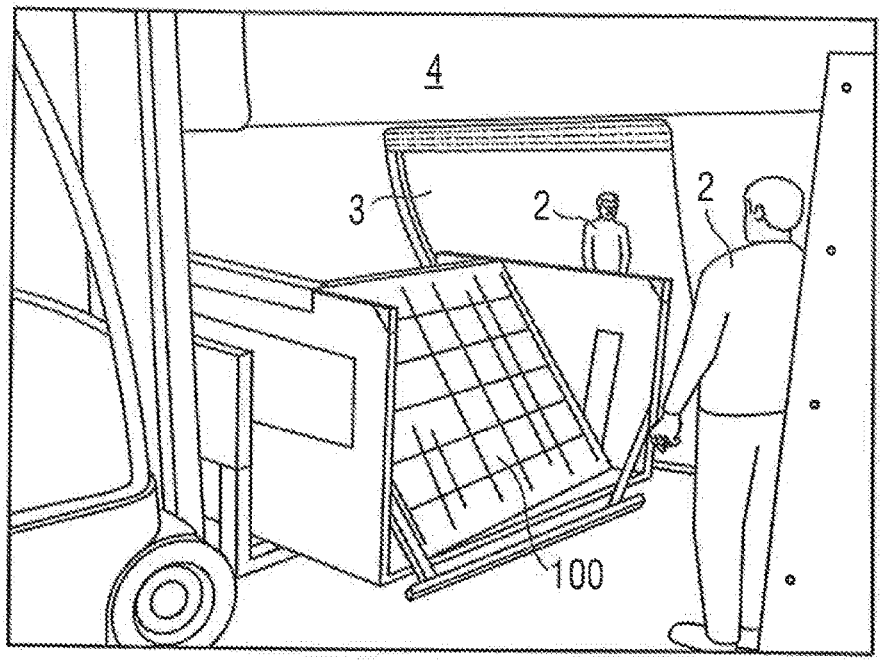
FIG. 11a) to g) shows steps of a lining panel mounting process according to a third embodiment of the present invention.
Figure 11B:
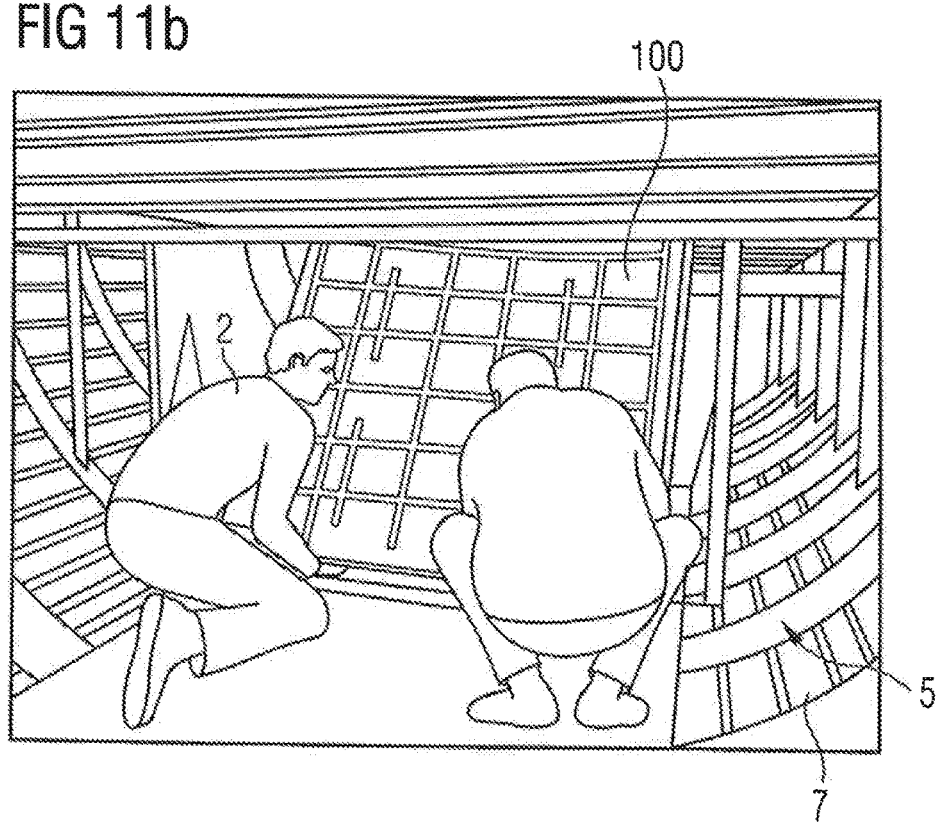
Figure 11C:
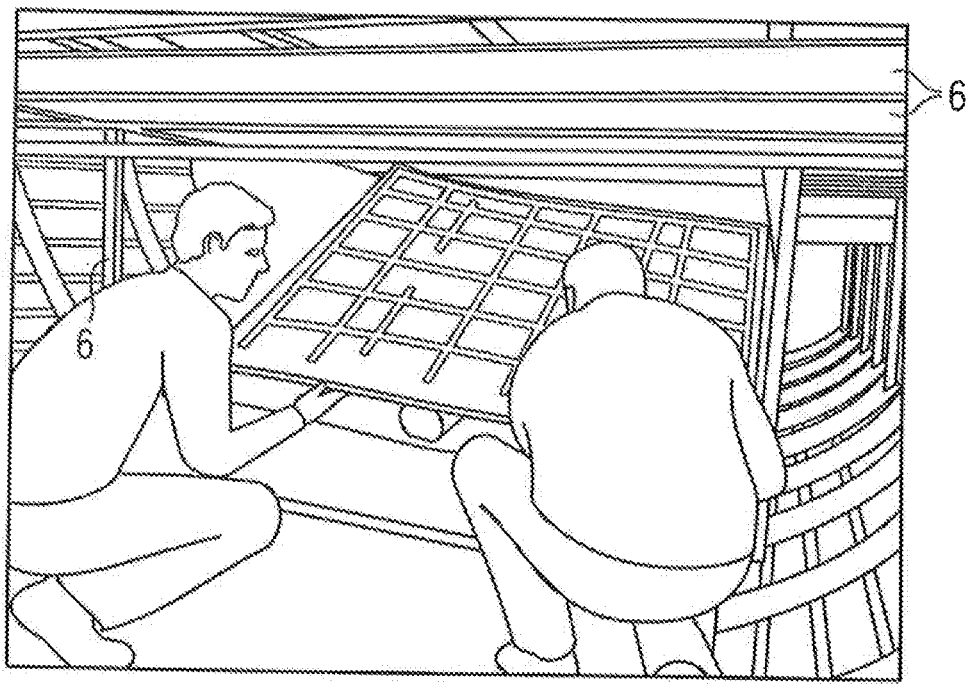
Figure 11D:
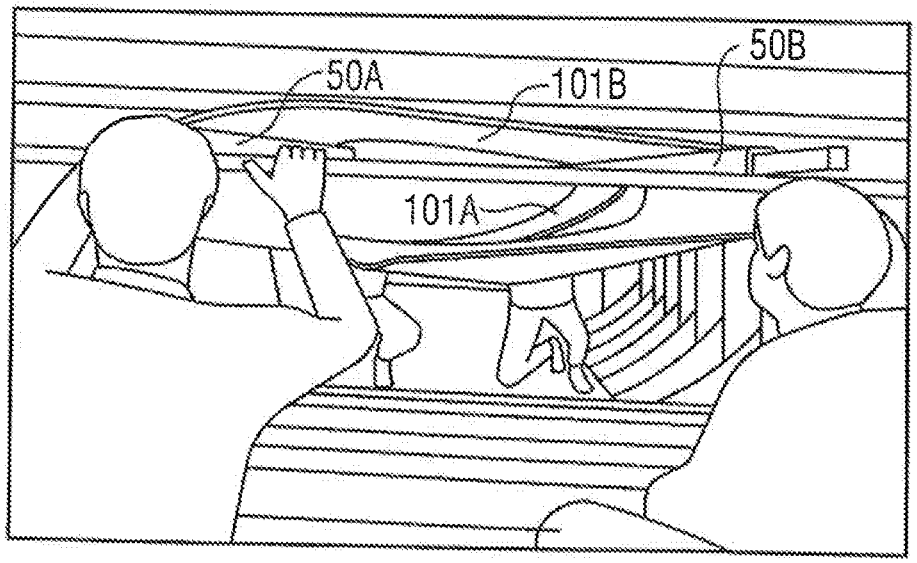
Figure 11E:
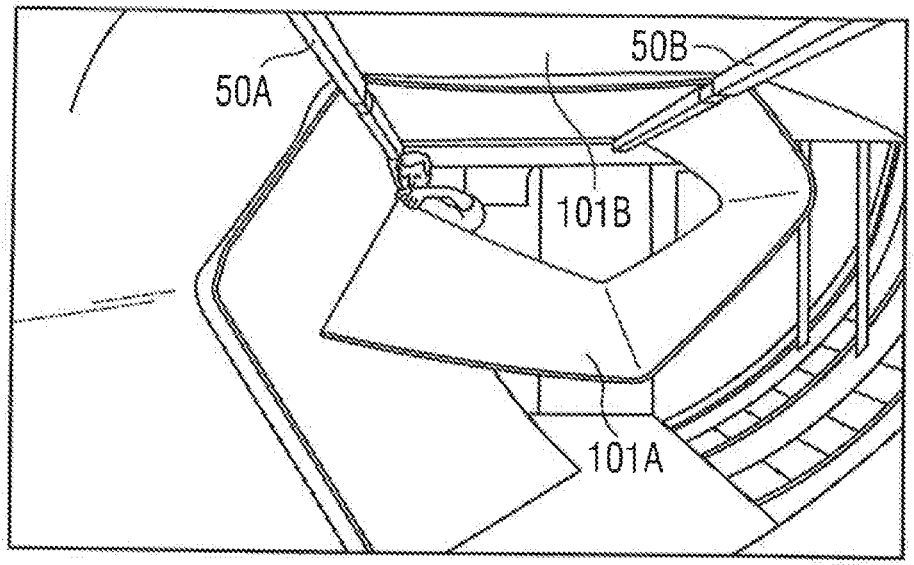
Figure 11F:
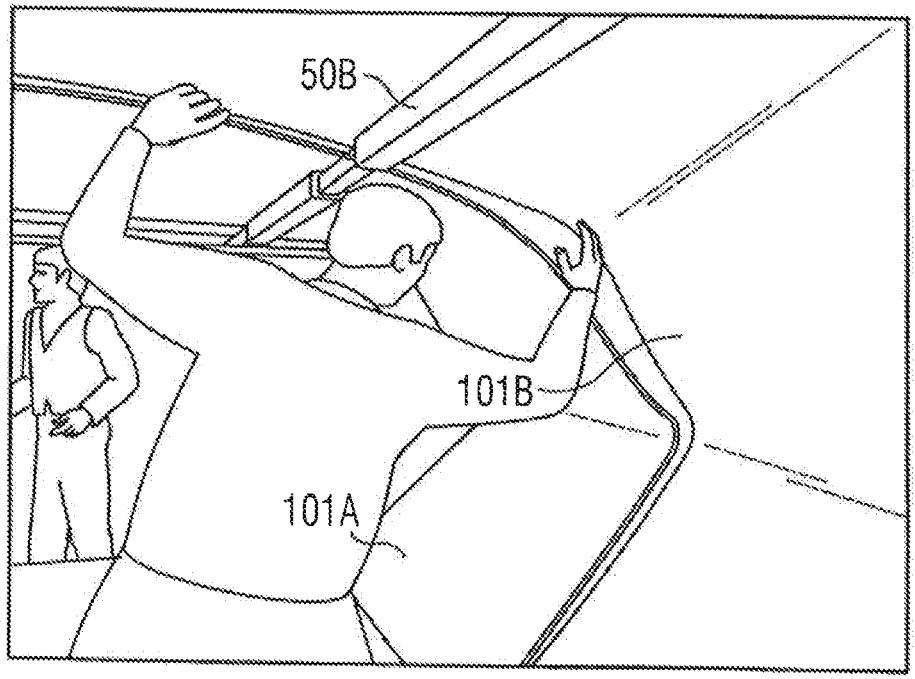
Figure 11G:
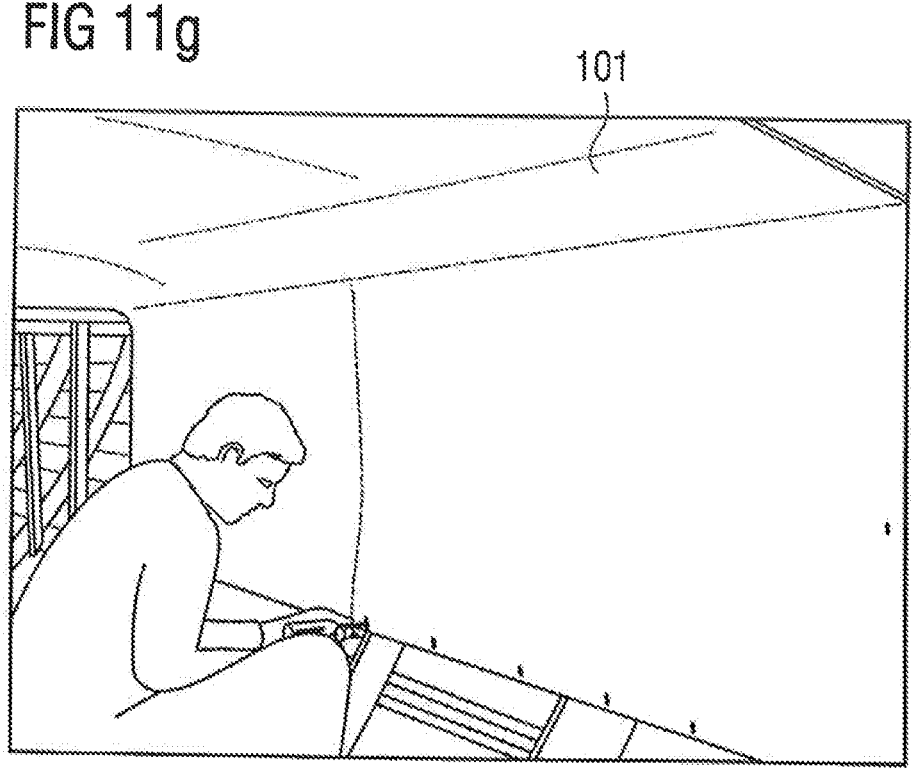

11b, the workers 2 transport the lining module 100 through a cargo compartment 5 of the aircraft 4. In the cargo department 5, a bar structure comprising a plurality of bars 104 is provided which is mounted on the inner walls 7 (here: the side walls and the ceiling) of the aircraft 4. In FIG. 11c, the workers 2 grasp the longitudinal elements 61, 62 (ropes) which are hidden below the lining panel 101 and lift the module 100 up while holding the longitudinal elements 61, 62. This effects that the module 100 "unfolds", i.e., in each installation device 50A, 50B, the first main beam section 52 pivots relative to the second main beam section 53 about an axis A1 aligned perpendicular to a longitudinal axis A2 of the first main beam section 52 such that the shape of the module 100 becomes flat. After the module has been suspended from the bars 104 via the installation devices 50A, 50B, a shown in FIG. 11d, the lining panel 101 can be unwrapped and fixed to the bars 104, see FIG. 11e. Different lining panels 101 or different parts 101A, 101B of the same lining panel 101 are connected with each other in a gastight manner using e.g. a zipper 130 (i.e., by closing the zipper), parts of it being provided at opposing longitudinal edges of the lining panels/lining panel parts 101, see FIG. 11f. Then, the installation devices 50A, 50B can be removed, see FIG. 1g.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An installation device for installing a lining panel in an aircraft, comprising:
   a main beam having a first main beam section and a second main beam section;
   a hinge pivotably connecting a first end of the first main beam section and a first end of the second main beam section with each other such that the first main beam section can be pivoted relative to the second main beam section about an axis aligned perpendicular to a longitudinal axis of the first main beam section;
   a first movable beam provided at a second end of the first main beam section such that it is movable relative to the first main beam section along the longitudinal axis thereof;
   a second movable beam provided at a second end of the second main beam section such that it is movable relative to the second main beam section along a longitudinal axis thereof;
   a first longitudinal element connected to an end of the first movable beam facing away from the first main beam section; and
   a second longitudinal element connected to an end of the second movable beam facing away from the second main beam section.

2. The installation device according to claim 1, wherein the hinge comprises a damping means which is configured to dampen the pivoting of the first main beam section relative to the second main beam section.

3. The installation device according to claim 1, wherein an end of the first longitudinal element facing away from the first movable beam is connected to a first hook, and wherein an end of the second longitudinal element facing away from the second movable member is connected to a second hook.

4. The installation device according to claim 3, wherein the first longitudinal element is connected to a third hook provided between the first hook and the first movable member, and wherein the second longitudinal element is connected to a fourth hook provided between the second hook and the second movable member.

5. The installation device according to claim 1, wherein the second end of the first main beam section has the shape of a tube into which at least a part of the first movable beam is inserted, wherein the inserted part of the first movable beam is movable within the tube along the longitudinal axis of the first main beam section, and wherein the second end of the second main beam section has the shape of a tube into which at least a part of the second movable beam is inserted, wherein the inserted part of the second movable beam is movable within the tube along the longitudinal axis of the second main beam section.

6. The installation device according to claim 5, comprising
   a first slit provided in a wall of the second end of the first main beam section, wherein the inserted part of the first movable beam is connected to a first protruding element which penetrates through the first slit, and wherein, by sliding the first protruding element along the first slit, the first movable element is moved along the longitudinal axis of the first main beam section, and
   a second slit provided in a wall of the second end of the second main beam section, wherein the inserted part of the second movable beam is connected to a second protruding element which penetrates through the second slit, and wherein, by sliding the second protruding element along the second slit, the second movable beam is moved along the longitudinal axis of the second main beam section.

7. The installation device according to claim 6, comprising
   the first protruding element being switchable from a first state in which sliding along the first slit is possible, into a second state in which sliding along the first slit is blocked, and vice versa, and
   the second protruding element being switchable from a second state in which sliding along the second slit is possible, into a second state in which sliding along the second slit is blocked, and vice versa.

8. The installation device according to claim 1, wherein at least parts of the outer surface of the first main beam section and the second main beam section are respectively covered with a damping element.

9. The installation device according to claim 8, wherein the damping element is a foam layer.

10. The installation device according to claim 1, wherein the longitudinal elements are ropes.

11. A package, comprising:
    at least one installation device for installing a lining panel in an aircraft, comprising:
    a main beam having a first main beam section and a second main beam section;
    a hinge pivotably connecting a first end of the first main beam section and a first end of the second main beam section with each other such that the first main beam section can be pivoted relative to the second main beam section about an axis aligned perpendicular to a longitudinal axis of the first main beam section;
    a first movable beam provided at a second end of the first main beam section such that it is movable relative to the first main beam section along the longitudinal axis thereof;

a second movable beam provided at a second end of the second main beam section such that it is movable relative to the second main beam section along a longitudinal axis thereof;
a first longitudinal element connected to an end of the first movable beam facing away from the first main beam section; and
a second longitudinal element connected to an end of the second movable beam facing away from the second main beam section, and
a lining panel wrapped around the at least one installation device, the lining panel being mountable to a bar structure within an aircraft.

12. The package according to claim 11, wherein a surface of the lining panel facing towards the at least one installation device comprises removably attached fixing elements at which hooks are fixable.

13. The package according to claim 11, wherein the package comprises two installation devices which are spaced apart from each other and are aligned parallel to each other, wherein the lining panel is wrapped around the installation devices such that two opposing edges of the lining panel which are aligned parallel to the longitudinal axes of the installation devices are connected with each other or opposing longitudinal end parts overlap with each other.

14. The package according to claim 11, wherein the first longitudinal element and the second longitudinal element extend over edges of the lining panel aligned perpendicular to the longitudinal axes of the installation devices.

* * * * *